United States Patent
Wipfel

(10) Patent No.: US 7,124,320 B1
(45) Date of Patent: Oct. 17, 2006

(54) CLUSTER FAILOVER VIA DISTRIBUTED CONFIGURATION REPOSITORY

(75) Inventor: Robert Wipfel, Draper, UT (US)

(73) Assignee: Novell, Inc., Provo, UT (US)

( * ) Notice: Subject to any disclaimer, the term of this patent is extended or adjusted under 35 U.S.C. 154(b) by 523 days.

(21) Appl. No.: 10/213,651

(22) Filed: Aug. 6, 2002

(51) Int. Cl.
*G06F 11/00* (2006.01)

(52) U.S. Cl. ......................................... 714/13; 714/15

(58) Field of Classification Search ................. 714/10, 714/13
See application file for complete search history.

(56) References Cited

U.S. PATENT DOCUMENTS

| | | | |
|---|---|---|---|
| 5,696,895 A * | 12/1997 | Hemphill et al. ............... 714/4 |
| 5,748,882 A * | 5/1998 | Huang ........................... 714/47 |
| 5,923,833 A * | 7/1999 | Freund et al. ................ 714/19 |
| 5,964,838 A * | 10/1999 | Cheung et al. ............. 709/224 |
| 6,058,490 A * | 5/2000 | Allen et al. ..................... 714/9 |
| 6,151,688 A | 11/2000 | Wipfel et al. |
| 6,266,781 B1 * | 7/2001 | Chung et al. ................... 714/4 |
| 6,338,112 B1 | 1/2002 | Wipfel et al. |
| 6,353,898 B1 | 3/2002 | Wipfel et al. |
| 6,360,331 B1 * | 3/2002 | Vert et al. ....................... 714/4 |
| 6,393,485 B1 * | 5/2002 | Chao et al. .................. 709/231 |
| 6,487,547 B1 * | 11/2002 | Ellison et al. ................. 707/2 |
| 6,553,401 B1 * | 4/2003 | Carter et al. ................ 709/200 |
| 6,718,486 B1 * | 4/2004 | Roselli et al. ................ 714/41 |
| 6,789,213 B1 * | 9/2004 | Kumar et al. ................. 714/13 |
| 6,957,251 B1 * | 10/2005 | Wisner et al. ............. 709/220 |
| 2004/0153708 A1 * | 8/2004 | Joshi et al. ..................... 714/4 |

OTHER PUBLICATIONS

Epema et al., "A worldwide flock of Condors", 1996, Elsevier Science BV.*

* cited by examiner

*Primary Examiner*—Scott Baderman
*Assistant Examiner*—Gabriel L. Chu
(74) *Attorney, Agent, or Firm*—Haynes and Boone, LLP

(57) ABSTRACT

A method and system to resolve a cluster failure in a networked environment is described. The method can include: configuring the application program in a directory based distributed configuration repository on the first cluster; replicating the application program's configuration via the external directory to the second cluster; mirroring the application's data on a first mirrored volume to a second mirrored volume; detecting failure of the first cluster; activating the second mirrored volume at the second cluster; and restarting the application program on the second cluster.

12 Claims, 3 Drawing Sheets

CLUSTER FAILOVER VIA DISTRIBUTED CONFIGURATION REPOSITORY

FIELD OF THE INVENTION

The invention relates generally to interconnected computers and, more particularly, to a system and method for providing global scale service mobility and disaster recovery.

BACKGROUND OF THE INVENTION

A cluster of computers is a group of interconnected computers, which can present a unified system image. The computers in a cluster, which are known as the "cluster nodes", typically share a disk, a disk array, or another nonvolatile memory. Computers which are merely networked, such as computers on the Internet or on a local area network, are not a cluster because they necessarily appear to users as a collection of independent connected computers rather than a single computing system. "Users" may include both human users and application programs. Unless expressly indicated otherwise, "programs" includes computer programs, tasks, threads, processes, routines, and other interpreted or compiled computer software.

Although every node in a cluster might be the same type of computer, a major advantage of clusters is their support for heterogeneous nodes. One possible example is an interconnection of a graphics workstation, a diskless computer, a laptop, a symmetric multiprocessor, a new server, and an older version of the server. Advantages of heterogeneity are discussed below. To qualify as a cluster, the interconnected computers must present a unified interface. That is, it must be possible to run an application program on the cluster without requiring the application program to distribute itself between the nodes. This is accomplished in part by providing cluster system software which manages use of the nodes by application programs.

In addition, the cluster typically provides rapid peer to peer communication between nodes. Communication over a local area network is sometimes used, but faster interconnections are much preferred. Compared to a local area network, a cluster area network usually has a much lower latency and much higher bandwidth. In that respect, cluster area networks resemble a bus. But unlike a bus, a cluster interconnection can be plugged into computers without adding signal lines to a backplane or motherboard.

Clusters may improve performance in several ways. For instance, clusters may improve computing system availability. "Availability" refers to the availability of the overall cluster for use by application programs, as opposed to the status of individual cluster nodes. Of course, one way to improve cluster availability is to improve the reliability of the individual nodes.

However, at some point it becomes cost-effective to use less reliable nodes and replace nodes when they fail. A node failure should not interfere significantly with an application program unless every node fails; if it must degrade, then cluster performance should degrade gracefully. Clusters should also be flexible with respect to node addition, so that applications benefit when a node is restored or a new node is added. Ideally, the application should run faster when nodes are added, and it should not halt when a node crashes or is removed for maintenance or upgrades. Adaptation to changes in node presence provides benefits in the form of increased heterogeneity, improved scalability, and better access to upgrades. Heterogeneity allows special purpose computers such as digital signal processors, massively parallel processors, or graphics engines to be added to a cluster when their special abilities will most benefit a particular application, with the option of removing the special purpose node for later standalone use or use in another cluster. Heterogeneity allows clusters to be formed using presently owned or leased computers, thereby increasing cluster availability and reducing cost. Scalability allows cluster performance to be incrementally improved by adding new nodes as one's budget permits. The ability to add heterogeneous nodes also makes it possible to add improved hardware and software incrementally.

SUMMARY OF THE INVENTION

The present invention provides a method and system for recovering from a complete location specific cluster failure. Services and data exhibit two levels of mobility with the use of the invention. The first level is intra-cluster high availability (i.e., mobility of services with retained access to shared data within the boundary of a cluster). This provides high availability for a company at a specific physical location; one example would be a data-center in Manhattan. The second level is inter-cluster high availability (i.e. the mobility of services with retained access to shared data between clusters). This provides high availability for a company across physical locations; one example would be a failover of a service from a data-center in Manhattan to a redundant data-center in New Jersey.

Disaster recovery is actually a specific example of the more general case of service mobility. When a network service and its attendant data is considered as a single logical entity, that entity can be migrated from one physical location to another. Therefore, it's possible to collocate users with their network service and migrate both from one physical location to another. This level of mobility makes the service and its data central, and the servers peripheral. Servers thus become anonymous processing elements that dynamically instantiate network services and connect them to their external data and users Moreover, a method and system to resolve a cluster failure in a networked environment is described. The method can include: configuring the application program in an external directory based distributed configuration repository accessible to all servers in the first cluster; automatically replicating the application program's configuration via the external directory thus making it accessible to the second cluster; mirroring the application program's data between a first mirrored volume accessible to the first cluster in the first location and a second mirrored volume accessible to the second cluster in the second location; detecting failure of the first cluster; activating the second mirrored volume on the second cluster; and restarting the application program on the second cluster.

Therefore, in accordance with the previous summary, objects, features and advantages of the present invention will become apparent to one skilled in the art from the subsequent description and the appended claims taken in conjunction with the accompanying drawings.

DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

Before detailing the architectures of the invention, the meaning of several important terms is clarified. Specific examples are given to illustrate aspects of the invention, but those of skill in the art will understand that other examples may also fall within the meaning of the terms used. Some terms are also defined, either explicitly or implicitly, elsewhere herein.

Some Terminology

As used here, "cluster" means a group of at least two interconnected computers ("nodes") which can present a unified system image. Note that the cluster may also support execution of cluster-aware applications which pierce the unified system image to directly influence or control the division of labor between nodes. In most cases, but not all, the cluster will also include a shared disk or shared disk array or other shared nonvolatile storage subsystem which is directly accessible to more than one, and usually all, of the nodes. The interconnected cluster nodes form a "system area network" which differs from legacy networks in that system area networks support presentation of a unified system image while legacy networks do not. Bandwidth and latency are thus measured with respect to local area networks and other legacy networks, and the numbers will change as the technologies of both system area networks and legacy networks advance. As used here, "legacy network" includes many local area networks, wide area networks, metropolitan area networks, and/or various "Internet" networks such as the World Wide Web, a private Internet, a secure Internet, a virtual private network, an extranet, or an intranet. Clusters may be standalone, or they may be connected to one or more legacy networks; discussions of the cluster as a "node" on a legacy network should not be confused with discussions of intra-cluster nodes. Clusters may also use a legacy network as a backup link, as discussed in connection with FIG. 2, for instance.

Clusters Generally

Figure 1:
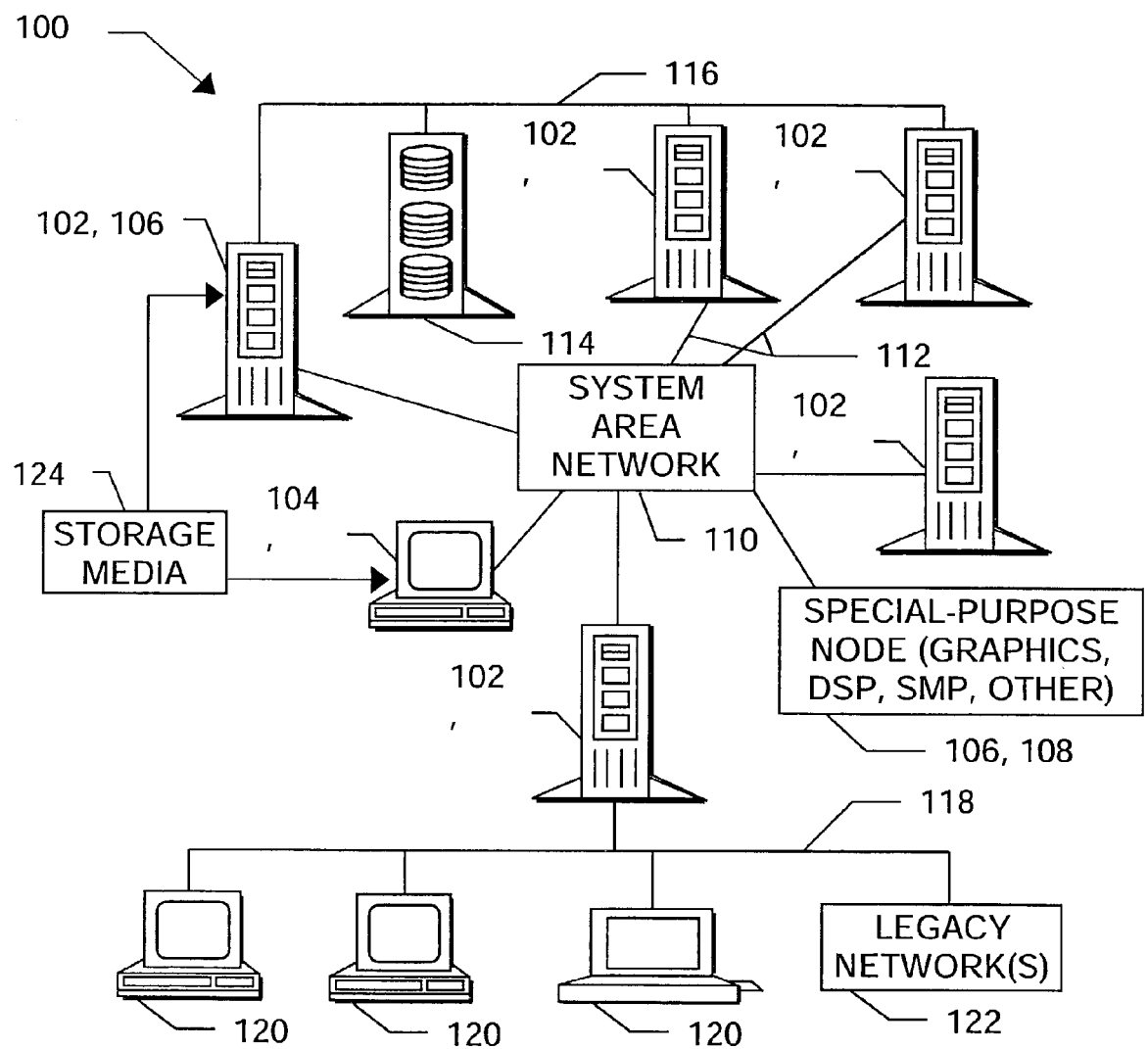
FIG. 1 is a diagram illustrating one of many clustered computer systems suitable for use according to the present invention.

One of many possible clusters suitable for use according to the invention is shown in FIG. 1, as indicated by the arrow labeled 100. The cluster 100 includes several servers 102 and a workstation node 104; other suitable clusters may contain other combinations of servers, workstations, diskless computers, laptops, multiprocessors, mainframes, so-called "network computers" or "lean clients", personal digital assistants, and/or other computers as nodes 106.

The illustrated cluster 100 includes a special-purpose node 108; other clusters may contain additional such nodes 108 or omit such nodes 108. The special-purpose node 108 is a computer tailored, by special-purpose hardware and/or software (usually both), to perform particular tasks more efficiently than general purpose servers 102 or workstations 104. To give but a few of the many possible examples, the node 108 may be a graphics engine designed for rendering computer-generated images, a digital signal processor designed for enhancing visual or audio signals, a parallel processor designed for query or transaction processing, a symmetric multiprocessor designed for molecular modeling or other numeric simulations, or some other special-purpose computer or computer system (the node 108 could itself be a cluster which is presently dedicated to a specific application).

Although clusters are typically formed using standalone computers as nodes 106, embedded computer systems such as those used in automated manufacturing, process control, real-time sensing, and other facilities and devices may also serve as nodes 106. Clusters may also include I/O systems, such as printers, process controllers, sensors, numerically controlled manufacturing or rapid prototyping devices, robots, other data or control ports, or other interfaces with the world outside the cluster.

The nodes 106 communicate through a system area network 110 using interconnects 112. Suitable interconnects 112 include Scalable Coherent Interface (LAMP) interconnects, serial express (SciLite), asynchronous transfer mode, HiPPI, Super HiPPI, FibreChannel, Myrinet, Tandem ServerNet, Infiniband and SerialBus (IEEE 10 1394/"FireWire") interconnects. The system area network 110 includes software for routing, switching, transport, and other networking functions.

The illustrated cluster also includes a shared disk array 114, such as a redundant array of disks. Other cluster embodiments include other shared nonvolatile storage such as uninterruptible-power-supply-backed random access memory. At least two servers 102 have access to the shared disks 114 through a channel 116 which does not rely on the interconnects 112 to operate.

One or more servers 102 may connect the cluster to a network 118 of workstations or mobile clients 120 and/or connect the cluster to other networks 122. The networks 118 and 122 are legacy networks (as opposed to system area networks) which may include communications or networking software such as the software available from Novell, Microsoft, and other vendors, and may operate using TCP/IP, SPX, IPX, and other protocols over twisted pair, coaxial, or optical fiber cables, telephone lines, satellites, microwave relays, modulated AC power lines, and/or other data transmission known to those of skill in the art. The networks 118 and 122 may encompass smaller networks and/or be connectable to other networks through a gateway or similar mechanism.

As suggested by FIG. 1, at least one of the nodes 106 is capable of using a floppy drive, tape drive, optical drive, magneto-optical drive, or other means to read a storage medium 124. A suitable storage medium 124 includes a magnetic, optical, or other computer-readable storage device having a specific physical configuration. Suitable storage devices include floppy disks, hard disks, tape, CD-ROMs, PROMs, random access memory, and other computer system storage devices. The physical configuration represents data and instructions which cause the cluster and/or its nodes to operate in a specific and predefined manner as described herein. Thus, the medium 124 can embody a program, functions, and/or instructions that are executable by computer(s) to assist cluster resource management.

Cluster Nodes

Figure 2:
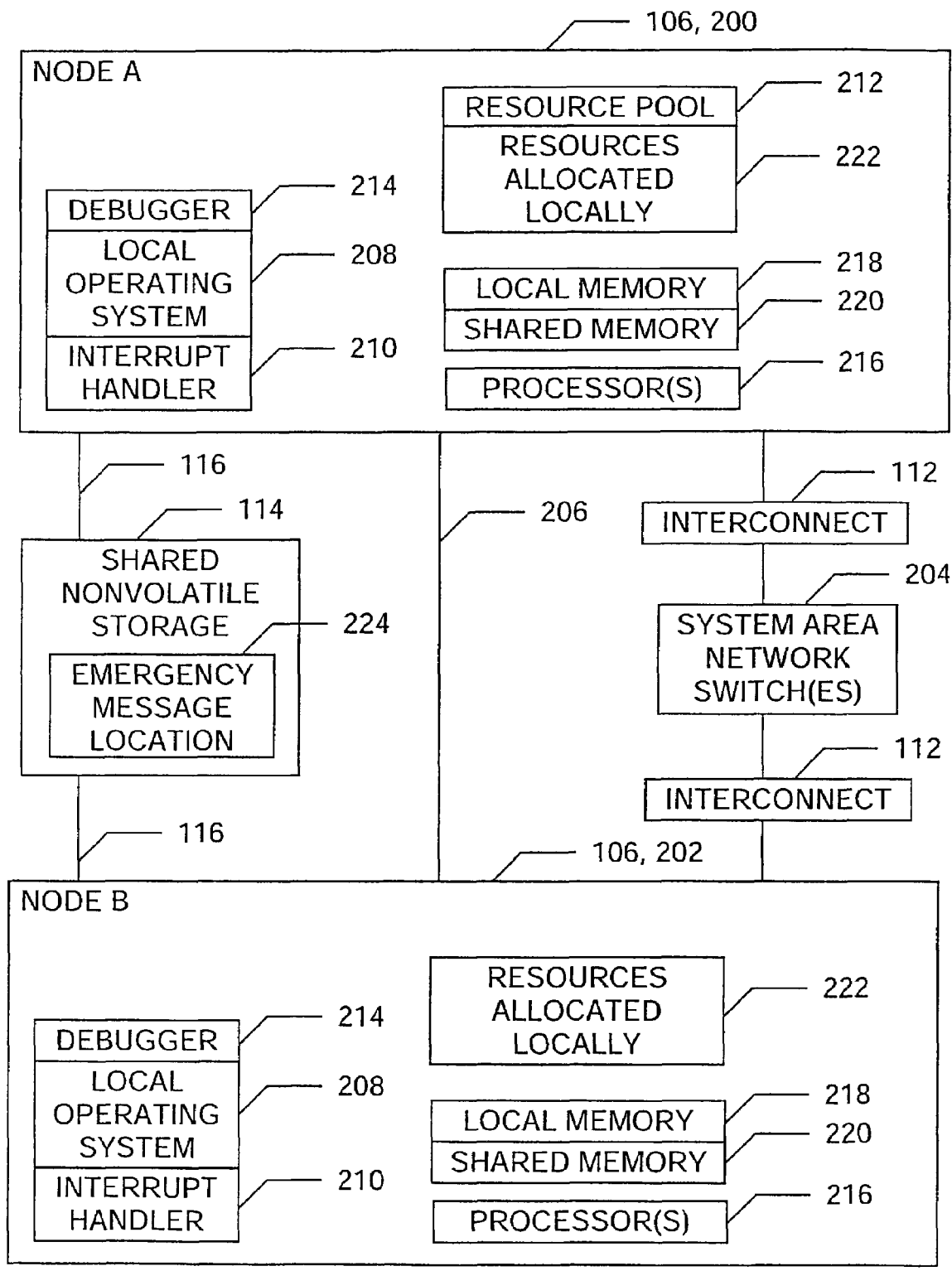
FIG. 2 is a diagram further illustrating two nodes in a cluster according to the invention.

An overview of two cluster nodes 200, 202 and their immediate environment is now given with reference to FIG. 2. The nodes 200, 202 are interconnected by interconnects 112 and one or more system area network switches 204.

Suitable interconnects 112 and switches 204 can include commercially available devices from Intel, Cisco, Brocade, QLogic and other suppliers.

In the illustrated cluster, the nodes 200 and 202 are also connected by a backup link 206 such as an RS-232 link, an Ethernet, or another local area network. The relatively low bandwidth and/or high latency of the backup link 206 in comparison to the system area network 112, 204 requires that use of the backup link be infrequent; the backup link 206 is typically used only in emergencies such as a failure of the system area network interconnection.

Other clusters do not include the backup link 206. Indeed, as explained below, the present invention provides a substitute for the backup link 206 in the form of an emergency communication channel using a shared disk in the storage area network 114. However, the inventive emergency communication channel may also be used to advantage clusters that include a backup link 206, to provide additional redundancy in communication paths. As discussed below, each of the illustrated nodes 200, 202 includes software, hardware in the form of processors and memory, and sharable resources which have been allocated to the node. Node A 200 also contains a pool 212 of resources which are not presently allocated.

The node 106 software includes a local operating system 208 such as Novell NetWare, Microsoft Windows NT, UNIX, IBM AIX, Linux, or another operating system (NETWARE is a mark of Novell; WINDOWS NT is a mark of Microsoft).

The illustrated node 106 software also includes a debugger 214. Cluster debuggers will generally be more complex than debuggers on standalone computers. For instance, it may be desirable to have every node 106 enter into debugging mode when one node 106 enters that mode. For this reason, and for convenience, the debuggers 214 on separate nodes 106 preferably communicate with one another, either through the system area network switch 204, the backup link 206, or an emergency communication channel.

Each node 106 includes one or more processors 216. Suitable processors include commercially available processors such as Intel processors, Motorola processors, Digital Equipment processors, and others. The processors 216 may include PALs, ASICs, microcoded engines, numeric or graphics coprocessors, processor cache, associated logic, and other processing hardware and firmware. Each node 106 also includes local memory 218 for storing data and instructions used and manipulated by the processors, including data and instructions for the software described above or elsewhere herein. The local memory may include RAM, ROM, flash memory, or other memory devices. The illustrated nodes 200, 202 also include shared memory 220 which is accessible by other nodes 106. Other cluster 100 configurations place all shared memory on a single node 106, or in a separate device which supports memory transfers but lacks a processor 216.

Each of the illustrated nodes 106 also contains resources 222 which have been allocated to the node 106 from the resource pool 212. As noted, the allocated resources may be memory buffers (residing in shared memory 220); credits toward bandwidth, priority or other scarce cluster resources, or any other computational resource which it is more cost-effective to share among nodes than it is to dedicate permanently to each node. By contrast, the processors 216 and interconnects 112 are typically dedicated rather than pooled. At other times during execution of instructions by the nodes 106, one or both the illustrated nodes 106 might have returned the resources to the pool 212. In other clusters, the pool 212 and/or associated structures that manage the allocation could also be distributed among several nodes 106 instead of residing on a single node 200.

Server clusters that are deployed using NetWare6, Novell Cluster Services and eDirectory provide location transparent mobility (failover) for network services. Because most Novell services are configured via eDirectory, they do not have to be tightly coupled to one particular server or another. This makes it possible to run a network service on one server, then, restart the same service on another server should the first server fail. This service-level mobility is a direct consequence of directory-based configuration. In other clustering solutions, services are configured via the registry or other server centric configuration files that bind the service to a particular physical server. This makes it difficult to migrate a service to another server because its configuration information is essentially statically bound to the server it was installed on. In these other cluster products, various schemes are employed to automatically replicate server centric registry or flat file based configuration across servers. In Linux, for example, service configuration is often represented by ".conf" files and scripts in the /etc/rc directories. To migrate a service from one server to another requires the copying and customization of configuration files to the other server. Customization of one server's files for another is often required because of server specific dependencies like network configuration.

Additionally, services are freely able to migrate from one server to another when their persistent data is accessible from any physical server. Servers attached to a storage area network (SAN) enable this capability. When attached to a SAN, any server can do block level I/O to any shared disk. For NetWare6, the Novell Storage Services file system was enhanced to fully support server independent hosting by eliminating server-centric metadata in the filesystem. NSS stores NDS globally unique identifiers in file system disk blocks to represent access control, ownership and other metadata. NSS filesystems can be activated by any server attached to the SAN (provided server are in the same NDS tree). The combination of server independent directory based service configuration, file system metadata and SAN based shared disk accessibility enables service mobility.

Novell Cluster Services is driven by NDS objects called cluster resources. Each cluster resource object represents a service that is dynamically instantiated by servers in the cluster. The service's data is held on shared disks accessible via the storage area network. Third party SAN hardware companies provide the means to replicate disk blocks between disk arrays in different locations. For example, when a NetWare server writes a disk block to a local disk array across the SAN, the disk array firmware commits that write to its local disk but also posts the write to a secondary disk in a second disk array. The first and second disk arrays can be separated by large distance. These disk array products expose a notion of primary versus secondary disk. The primary disk is the disk that is in use by the NetWare server or servers. The secondary disk cannot be accessed directly by NetWare servers but is kept in sync with I/O activity on its primary partner disk. If the location that contains the primary disk should fail, the secondary disk is promoted to become a primary, and then servers in the secondary location are able to access the same data. In this situation, even though the data is available at the second location, the service that is configured to use the data is not available there. The invention inherits the idea of primary versus secondary disk.

A mobile network service is the combination of data plus service configuration. Additionally, the service's code is static and assumed to be available across all servers. Moreover, the code is constant: what gives a mobile network service its personality is its configuration and persistent data (i.e., a directory enabled MySQL database). Each cluster resource is considered primary in its original location. DirXML is used to automatically generate a secondary copy of the cluster resource and other related objects for the secondary location. In practice, this means copying one set of objects from one cluster container to another in the same NDS tree. The replication process requires that the cluster resource objects be modified to suite their new location. For example, when a primary cluster resource is copied to make a secondary cluster resource, additional commands are added to the cluster resource load script to instruct the hardware to switch over access to the secondary disk from primary to secondary. DirXML can be used to automate the site-specific modification of cluster resources. For example, it might be necessary to modify cluster resource load scripts or other objects to alter name to IP address advertisement for service names to match whatever network is available at the secondary location.

Figure 3:
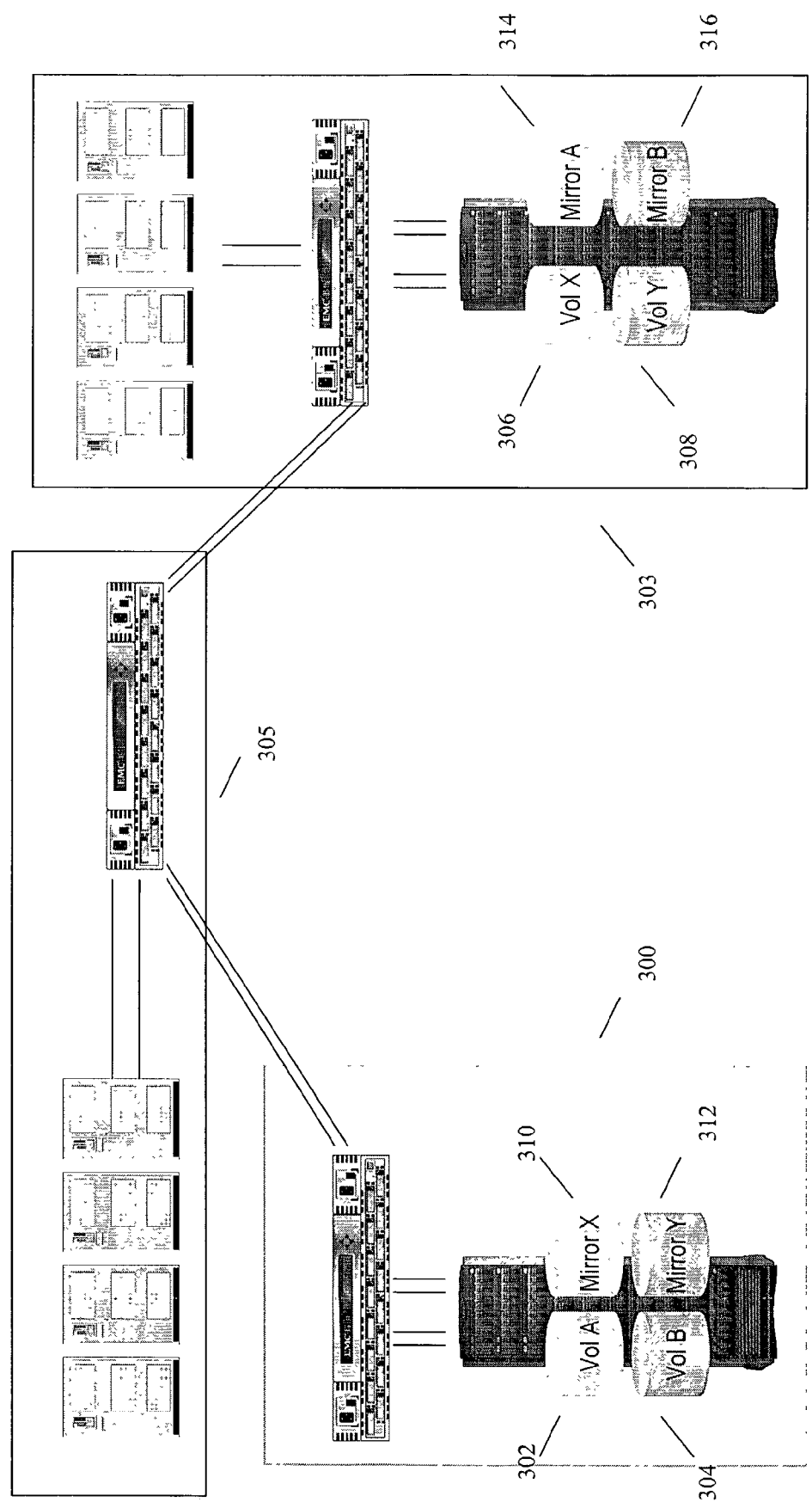
FIG. 3 is a diagram illustrating an example of the preferred embodiment.

Now turning to FIG. 3, the following example shows how this works. In this example, there are three clusters: a first cluster 300 and a second cluster 303 and a third cluster 305. The first cluster 300 has two cluster volume resources: cluster volume resource A 302 and second cluster volume resource B 304. The third cluster 305 will not be active in this example, but is shown for illustration purposes only.

Additionally, the second cluster 303 has two cluster volume resources: cluster volume resource X 306 and cluster volume resource Y 308. Moreover, in this example, the primary site for cluster volume resources X 306 and Y 308 is second cluster 303, and the primary site for cluster volume resources A 302 and B 304 is first cluster 300.

In the case where cluster 303 fails, cluster resources 306 and 308 need to be available at cluster 300. In order to accomplish this, the invention implements two extra cluster volume resources that mirror volume X and volume Y called mirror X 310 and mirror Y 312. Mirror X 310 and mirror Y 312 start in the offline state during normal operation; in the case of using Novell's Netware, the mirrors 310 and 312 are created by DirXML'ing the cluster resources from the second cluster 303 to the first cluster 300 and are NDS objects.

In the load script of mirror X 310, the script commands are present to make its LUN primary at the first cluster 300. Thus, when the second cluster 303 fails (a catastrophe), an administrator at the first cluster 300 only needs to online the mirror X 310 and Y 312 cluster resources.

The administrator could even online the mirrors via a command line interface on Netware version 6 once an email or other indication is received indicating that the second cluster 303 has failed.

Furthermore, in this example, volumes A 302 and B 304 also have mirror resources at the second cluster 303, called mirror A 314 and B 316 to deal with the case when the first cluster 300 fails.

It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

The invention claimed is:

1. A method for restarting an application program residing on a first cluster after the first cluster fails, the method comprising:
    configuring the application program in a directory based distributed configuration repository on the first cluster;
    replicating the application program's configuration via the directory based distributed configuration repository to be accessible to a second cluster;
    mirroring the application program's data on a first mirrored volume to a second mirrored volume;
    detecting failure of the first cluster;
    activating the second mirrored volume at the second cluster; and
    restarting the application program on the second cluster.

2. The method of claim 1,
    wherein the application program on the first cluster is on a first disk and wherein the failure of the first cluster includes only failure of the first disk.

3. The method of claim 1 wherein the first cluster and the second cluster are network objects.

4. The method of claim 1, further including
    mirroring a second application program, residing on the second cluster wherein the mirroring is on a second mirrored volume on the first cluster.

5. The method of claim 4 further including:
    detecting failure of the second cluster;
    onlining the second mirrored volume on the first cluster; and
    restarting the second application program on the first cluster.

6. A computer-readable medium storing a computer program executable by a computer for restarting an application program residing on a first cluster after the first cluster fails, the computer-readable medium comprising:
    computer instructions for configuring the application program in a directory based distributed configuration repository on the first cluster;
    computer instructions for replicating the application program's configuration via the directory based distributed configuration repository on a first mirrored volume on a second cluster in an offline state;
    computer instructions for detecting failure of the first cluster;
    computer instructions for onlining the second cluster; and
    computer instructions for restarting the application program residing on the second cluster.

7. The computer-readable medium of claim 6, wherein the application program on the first cluster is on a first disk and wherein the failure of the first cluster includes only failure of the first disk.

8. The computer-readable medium of claim 6 wherein the first cluster and the second cluster are network objects.

9. The computer-readable medium of claim 8, further including
    computer instructions for replicating a second application program's configuration via the directory based distributed configuration repository residing on the second cluster wherein the mirroring is on a second mirrored volume on the first cluster.

10. A computer system for restarting an application program residing on a first cluster after the first cluster fails, the system comprising:
    a first cluster with a first volume;
    a first application program residing on the first volume wherein the first application program is configured in a directory based distributed configuration repository, wherein the application program's data is on the first volume;

a second cluster with a mirror of the first volume and connected to the first cluster;

a second volume on the second cluster, wherein the application program's configuration is replicated via the directory based distributed configuration repository to be accessible to the second cluster; and a mirror of the second volume wherein the mirror of the second volume resides on the first cluster, wherein the mirror of the first volume and the mirror of the second volume are in offline mode.

11. A computer system for restarting an application program residing on a first cluster after the first cluster fails, the system comprising:

a first cluster with a first volume;

a first application program residing on the first volume wherein the first application program is configured in a directory based distributed configuration repository;

a second cluster with a mirror of the first volume and connected to the first cluster;

a second volume on the second cluster, wherein the application program's configuration is replicated via the directory based distributed configuration repository to be accessible to a second cluster; and a mirror of the second volume wherein the mirror of the second volume resides on the first cluster, wherein the mirror of the first volume and the mirror of the second volume are in offline mode; and a third volume on the first cluster and a mirror of the third volume on the second cluster.

12. The computer system of claim 11 further including a second application program residing on the third volume and a mirror copy of the second application program's data on the mirror of the third volume on the second cluster and wherein the mirror copy of the second application program's data is restored when the third volume has a failure.

* * * * *